US012522272B2

(12) United States Patent
Long

(10) Patent No.: US 12,522,272 B2
(45) Date of Patent: Jan. 13, 2026

(54) CASTER WHEEL BRAKE SYSTEM

(71) Applicant: Pipp Mobile Storage Systems, Inc., Walker, MI (US)

(72) Inventor: Matthew M. Long, Lakemoor, IL (US)

(73) Assignee: Pipp Mobile Storage Systems, Inc., Walker, MI (US)

( * ) Notice: Subject to any disclaimer, the term of this patent is extended or adjusted under 35 U.S.C. 154(b) by 388 days.

(21) Appl. No.: 18/179,836

(22) Filed: Mar. 7, 2023

(65) Prior Publication Data

US 2023/0278613 A1 Sep. 7, 2023

Related U.S. Application Data

(60) Provisional application No. 63/317,269, filed on Mar. 7, 2022.

(51) Int. Cl.
*B62B 5/04* (2006.01)
*B60B 33/00* (2006.01)
*F16D 63/00* (2006.01)
*F16D 65/28* (2006.01)
*F16D 121/16* (2012.01)
*F16D 127/04* (2012.01)

(52) U.S. Cl.
CPC ........ *B62B 5/0461* (2013.01); *B60B 33/0084* (2013.01); *F16D 63/006* (2013.01); *F16D 65/28* (2013.01); *B60B 2200/43* (2013.01); *B60B 2900/3312* (2013.01); *F16D 2121/16* (2013.01); *F16D 2127/04* (2013.01)

(58) Field of Classification Search
CPC .............. B62B 5/0461; B60B 33/0084; B60B 2200/43; B60B 2900/3312; F16D 63/006; F16D 65/28; F16D 2121/16; F16D 2127/04
See application file for complete search history.

(56) References Cited

U.S. PATENT DOCUMENTS 607,329 A 7/1898 Beebe
1,559,796 A 11/1925 Shuey et al.
(Continued)

FOREIGN PATENT DOCUMENTS

DE 19516586 A1 11/1996
DE 102010051099 A1 11/2011
(Continued)

*Primary Examiner* — David R Morris
(74) *Attorney, Agent, or Firm* — Gardner, Linn, Burkhart & Ondersma LLP

(57) ABSTRACT

A caster wheel brake system for carts and other wheeled articles is operable to secure caster wheels against rolling rotation along their horizontal rotation axes. The system includes a pivotable parking brake lever, an actuator arm, and a torque shaft extending between the brake lever and actuator arm. The brake lever includes a distal end portion for selectively engaging a caster wheel, a proximal end portion opposite the distal end portion, and a pivot coupling, the latter being pivotably secured to the cart or wheeled article. An actuator arm extends outwardly from a distal end portion of the torque shaft, with the actuator arm slidably engaging the proximal end portion of the brake lever. The torque shaft and the actuator arm are rotatable together to urge the brake lever toward the braking or non-braking position.

17 Claims, 13 Drawing Sheets

(56) References Cited

U.S. PATENT DOCUMENTS

| | | | |
|---|---|---|---|
| 2,262,433 | A | 11/1941 | Uecker et al. |
| 2,417,694 | A | 3/1947 | Larsson |
| 2,709,828 | A | 6/1955 | Noelting et al. |
| 3,409,105 | A | 11/1968 | Clinton |
| 3,571,842 | A | 3/1971 | Fricke |
| 3,701,396 | A | 10/1972 | House |
| 3,828,392 | A | 8/1974 | Bolger |
| 3,840,242 | A | 10/1974 | Craig, Sr. et al. |
| 3,881,216 | A | 5/1975 | Fontana |
| 3,911,525 | A | 10/1975 | Haussels |
| 4,066,151 | A | 1/1978 | Liebscher et al. |
| 4,205,413 | A | 6/1980 | Collignon et al. |
| 4,248,445 | A | 2/1981 | Vassar |
| 4,526,253 | A | 7/1985 | Schmidt |
| 5,139,116 | A | 8/1992 | Screen |
| 5,170,529 | A | 12/1992 | Kovacs |
| 5,579,871 | A | 12/1996 | Emmrich et al. |
| 5,634,532 | A | 6/1997 | Bucher |
| 5,979,917 | A | 11/1999 | Thoegersen et al. |
| 6,219,881 | B1 | 4/2001 | Wen |
| 6,237,725 | B1 | 5/2001 | Otterson et al. |
| 6,662,404 | B1 | 12/2003 | Stroh et al. |
| 7,011,317 | B1 | 3/2006 | Hicks et al. |
| 7,213,816 | B2 | 5/2007 | Gregory et al. |
| 7,320,472 | B2 | 1/2008 | Gregory et al. |
| 7,406,989 | B1 | 8/2008 | Casaus |
| 8,024,101 | B2 | 9/2011 | Froli |
| 8,397,345 | B2 | 3/2013 | Von Bordelius et al. |
| 8,484,802 | B1 | 7/2013 | Lin et al. |
| 8,516,656 | B2 | 8/2013 | Lin et al. |
| 8,973,217 | B2 | 3/2015 | Weichbrodt |
| 11,324,648 | B2 | 5/2022 | Van Loon |
| 11,772,420 | B2 | 10/2023 | Long |
| 2004/0041462 | A1 | 3/2004 | Hicks |
| 2005/0023787 | A1 | 2/2005 | Haynes |
| 2006/0131110 | A1 | 6/2006 | Chung |
| 2007/0216117 | A1 | 9/2007 | Figel et al. |
| 2008/0120810 | A1 | 5/2008 | Reckelhoff et al. |
| 2011/0107554 | A1 | 5/2011 | Minowa |
| 2011/0119864 | A1 | 5/2011 | Monowa |
| 2012/0160617 | A1 | 6/2012 | Qi et al. |
| 2013/0111664 | A1 | 5/2013 | Childs et al. |
| 2013/0306431 | A1* | 11/2013 | Ruehle ............... F16H 63/483 |
| | | | 192/219.4 |
| 2015/0210114 | A1 | 7/2015 | Spektor |
| 2019/0358998 | A1 | 11/2019 | Patmore et al. |
| 2020/0325987 | A1* | 10/2020 | Nishimoto ............. B60K 5/04 |
| 2022/0371640 | A1 | 11/2022 | Long |

FOREIGN PATENT DOCUMENTS

| | | |
|---|---|---|
| DE | 202013009346 U1 | 1/2015 |
| DE | 202013010367 U1 | 1/2015 |
| DE | 102013110134 A1 | 4/2015 |
| DE | 202014003033 U1 | 7/2015 |
| DE | 202016100180 U1 | 2/2016 |
| DE | 202015107054 U1 | 5/2016 |
| DE | 202013103086 U1 | 8/2016 |
| DE | 202015103436 U1 | 10/2016 |
| DE | 202016103756 U1 | 10/2016 |
| DE | 202016106442 U1 | 11/2016 |
| DE | 102019123213 B3 | 12/2020 |
| EP | 2669143 A2 | 12/2013 |
| ES | 2588163 T3 | 10/2016 |

* cited by examiner

CASTER WHEEL BRAKE SYSTEM

CROSS REFERENCE TO RELATED APPLICATIONS

The present invention claims the benefit of U.S. provisional application Ser. No. 63/317,269, filed Mar. 7, 2022, which is hereby incorporated herein by reference in its entirety.

FIELD OF THE INVENTION

This invention relates in general to caster wheel parking brake systems for carts and the like.

BACKGROUND OF THE INVENTION

Casters are used to support and move various equipment or structures that broadly include any implement on at least one wheel that is typically moved by manual force, such as a push cart, a wheelchair, or a wheeled bed frame. Casters can include one or more wheels and are employed to facilitate moving a structure to which the casters are mounted or attached. It may be desirable to prevent the caster wheel from rolling, such as when the associated cart or structure is positioned on an incline, or when any inadvertent movement of the structure could damage the structure or other objects or surfaces, or create a safety hazard.

SUMMARY OF THE INVENTION

The present invention provides a caster braking system that can be integrated with one or more wheels of a mobile structure, such as a push cart, a wheel chair, or the like. By preventing rolling rotation of a caster wheel, the caster braking system causes the locked wheel to resist movement of the mobile structure in any direction along a support surface, such as a warehouse floor. This provides enhanced stabilization for the mobile structure when the system is locked, and the system can be readily locked or unlocked with a single motion, such as pressing down on a portion of an actuation lever.

In one form of the present invention, a caster wheel brake system for carts and other wheeled articles is operable to selectively secure caster wheels against rotation about their rotation axes. The system includes a pivotable parking brake lever, an actuator arm, and a torque shaft extending between the brake lever and actuator arm. The brake lever includes a distal end portion for selectively engaging a caster wheel, a proximal end portion opposite the distal end portion, and pivot coupling at the cart or wheeled article. An actuator arm extends outwardly from a distal end portion of the torque shaft, with the actuator arm slidably engaging the proximal end portion of the brake lever. The torque shaft and the actuator arm are rotatable together to urge the brake lever toward the braking or non-braking position.

According to one aspect, the system includes a resilient or elastic member coupled to the brake lever for biasing the brake lever toward the braking position. The torque shaft and actuator arm are rotatable against the biasing force of the resilient member to urge the brake lever toward the non-braking position.

These and other objects, advantages, purposes and features of the present invention will become apparent upon review of the following specification in conjunction with the drawings.

DETAILED DESCRIPTION OF PREFERRED EMBODIMENTS

Figure 1:
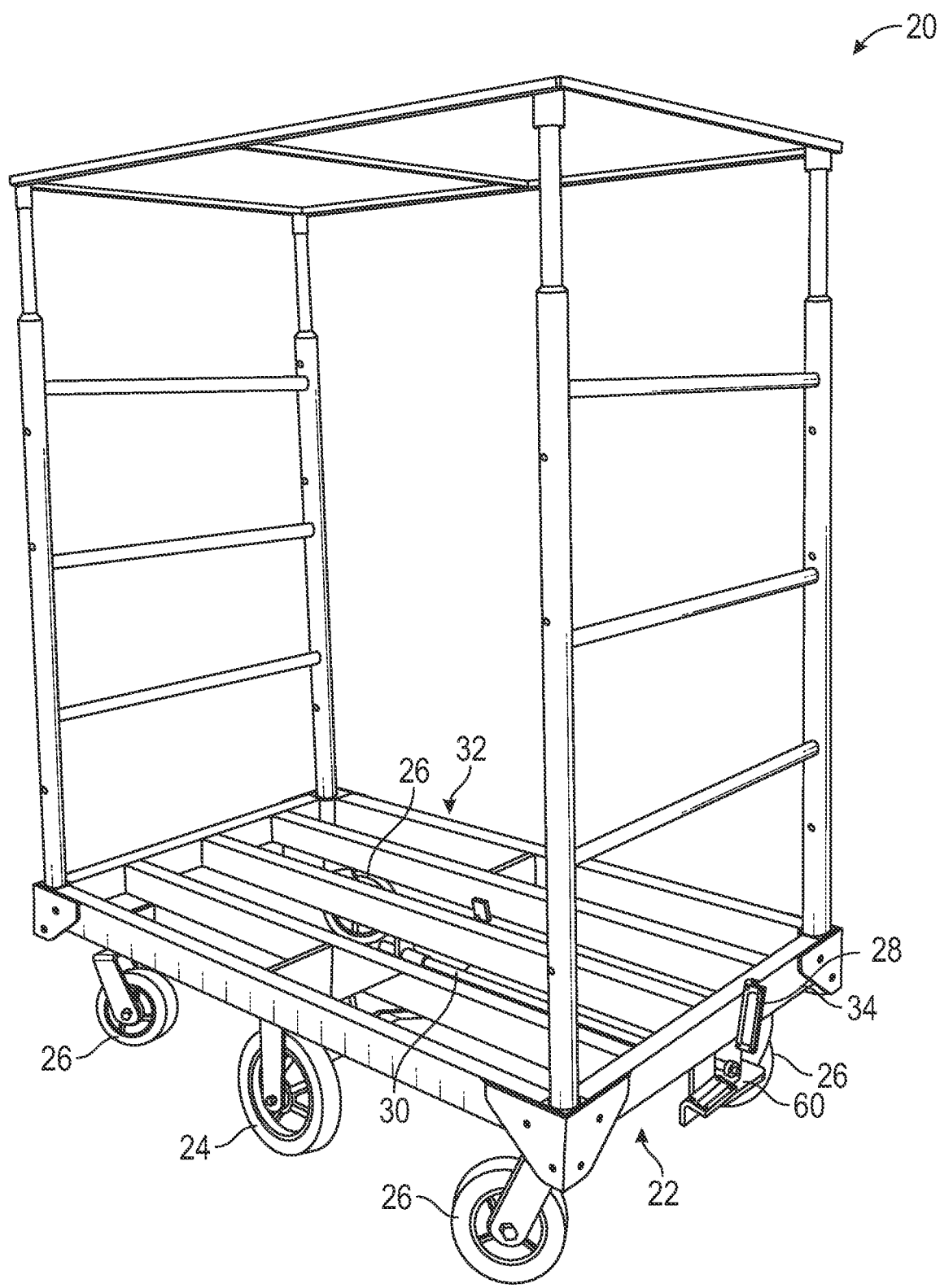
FIG. 1 is a perspective view of a cart fitted with a caster wheel parking brake system in accordance with the present invention.
Figure 2:
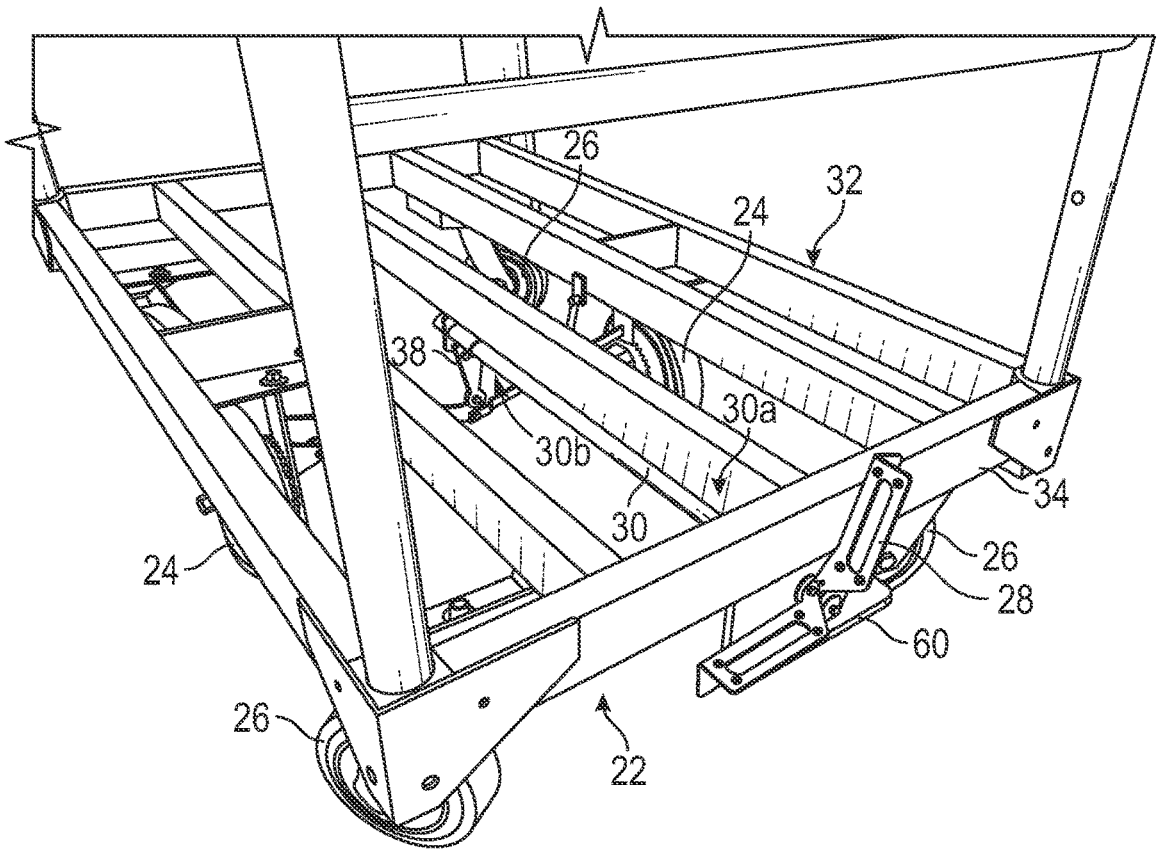
FIG. 2 is an enlarged perspective view of a lower region of the cart and caster wheel parking brake system.
Figure 3:
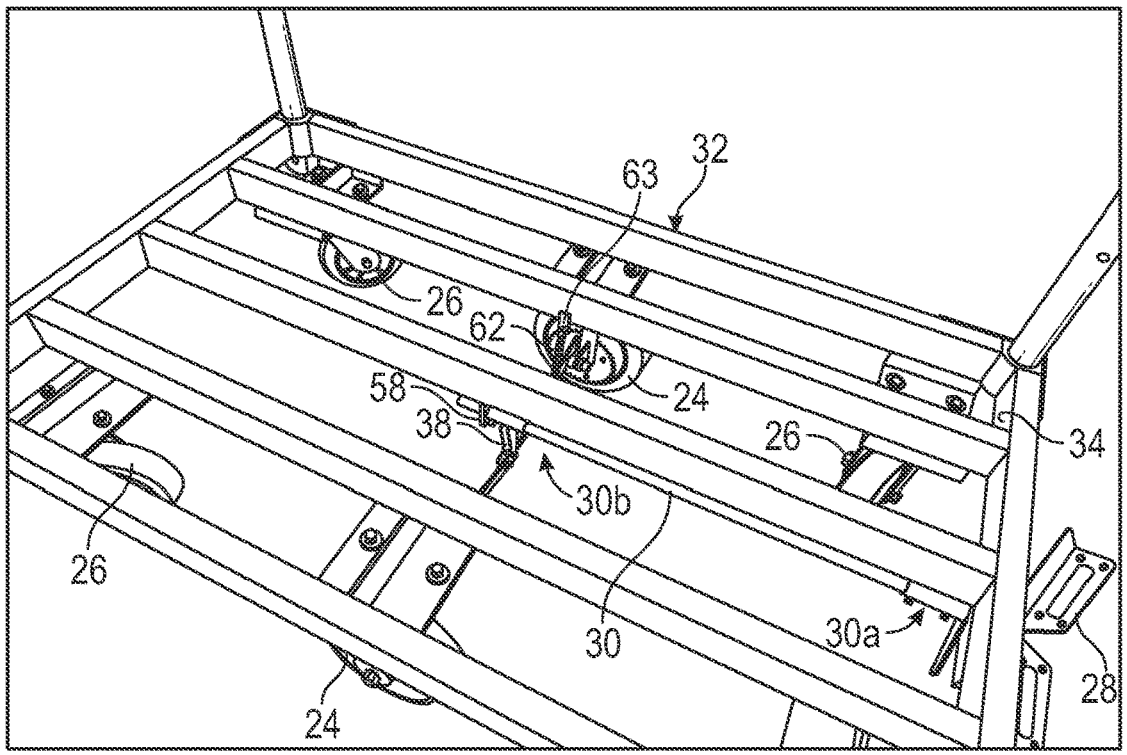
FIG. 3 is another enlarged perspective view of a lower region of the cart and caster wheel parking brake system.

Referring now to the drawings and the illustrative embodiments, in particular FIGS. 1-4, a push cart 20 is provided with a caster wheel brake system 22 that allows a user to selectively lock and unlock a pair of non-swiveling central caster wheels 24 against rolling motion, as will be described in more detail below. Two pair of swiveling caster wheels 26 support opposite end portions of push cart 20, which is representative of substantially any mobile support or storage device that is used to support articles for transport, typically within a facility such as a warehouse, a factory, a retail store, or the like. Push cart 20 is manually movable by an individual operator, although in some cases a push cart may be self-powered and controlled by an operator. By selectively locking and unlocking central caster wheels 24, caster wheel brake system 22 serves as parking brake for use when the cart 20 is not being moved and should be immobilized such as for safety reasons, or when parked on an incline. In the illustrated embodiment, central caster wheels 24 are larger than swiveling caster wheels 26 so that cart 20 is fully or partially supported on central caster wheels 24 at all times, and is selectively partially supported at one pair of swiveling caster wheels when a load on cart 20 is not centered above center caster wheels 24, or when a user lifts up or pushes down on one end of the cart to maneuver it.

Figure 4:
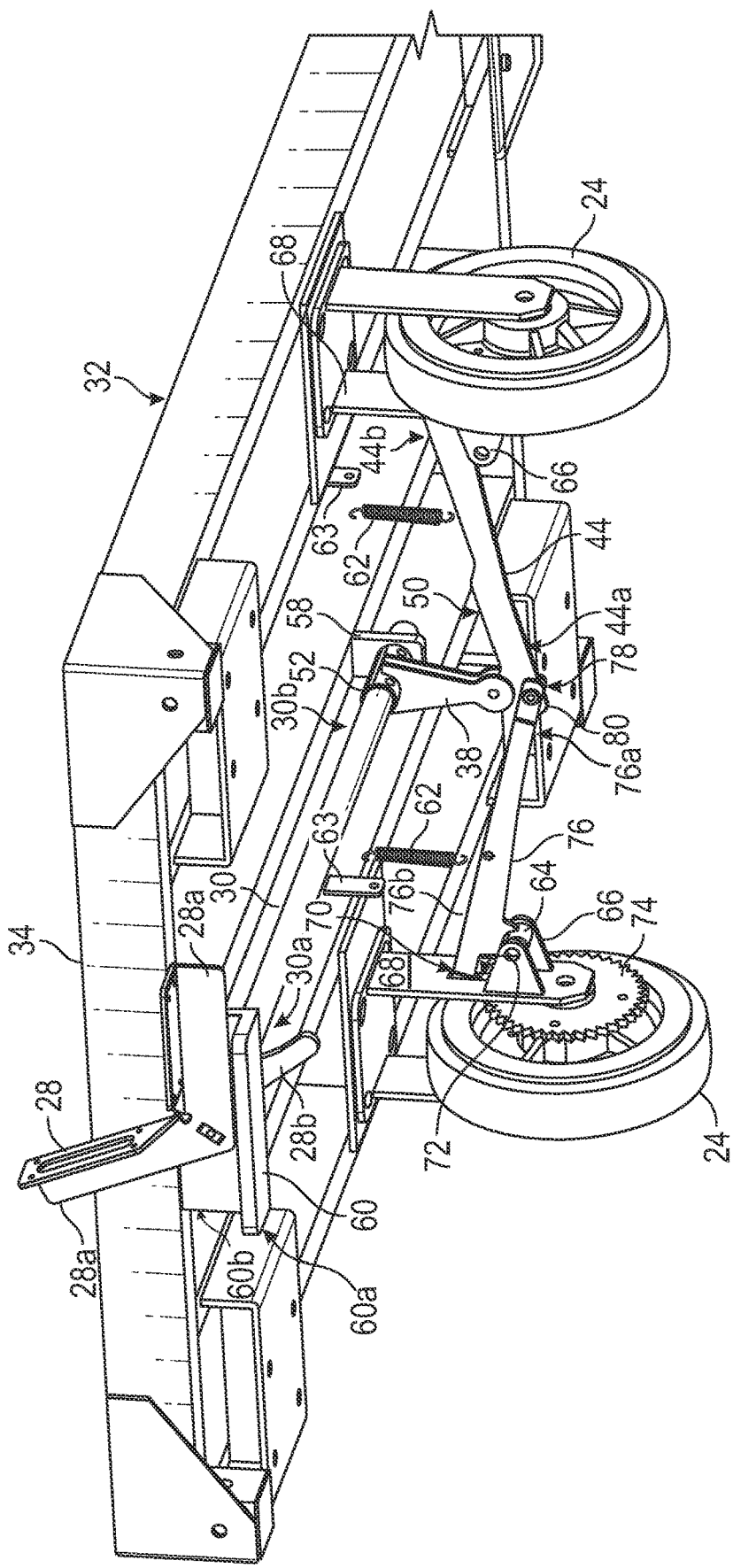
FIG. 4 is a bottom perspective view of a lower region of the cart and caster wheel parking brake system.
Figure 5:
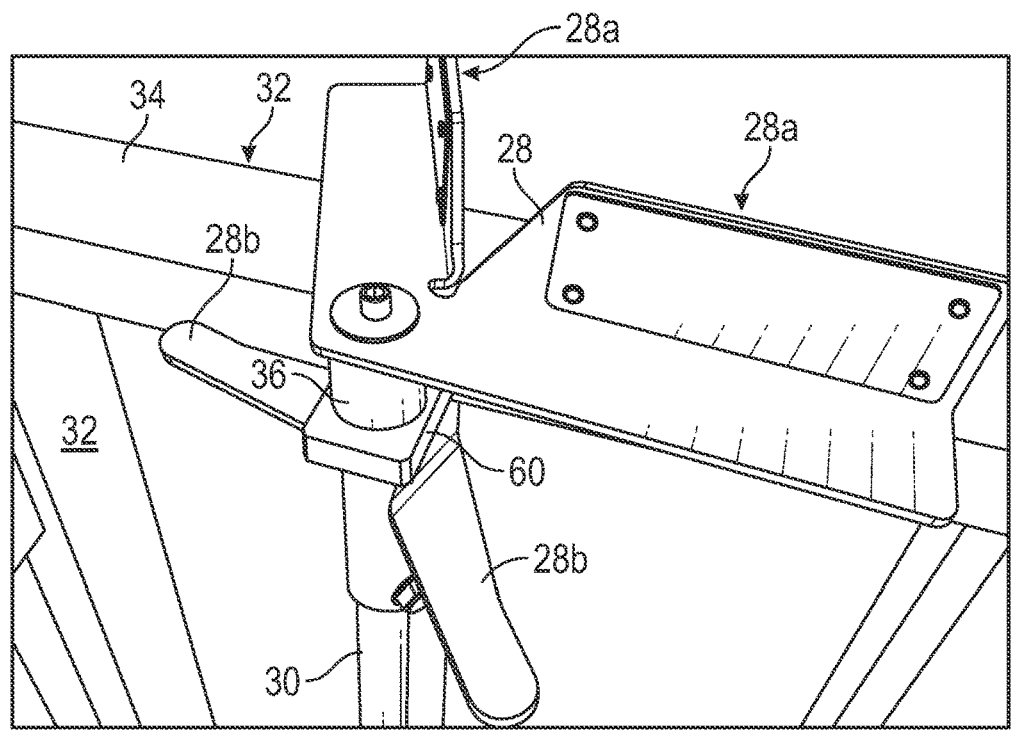
FIG. 5 is an enlarged bottom perspective view of a portion of the cart and caster wheel parking brake system, showing a brake actuator.
Figure 6:
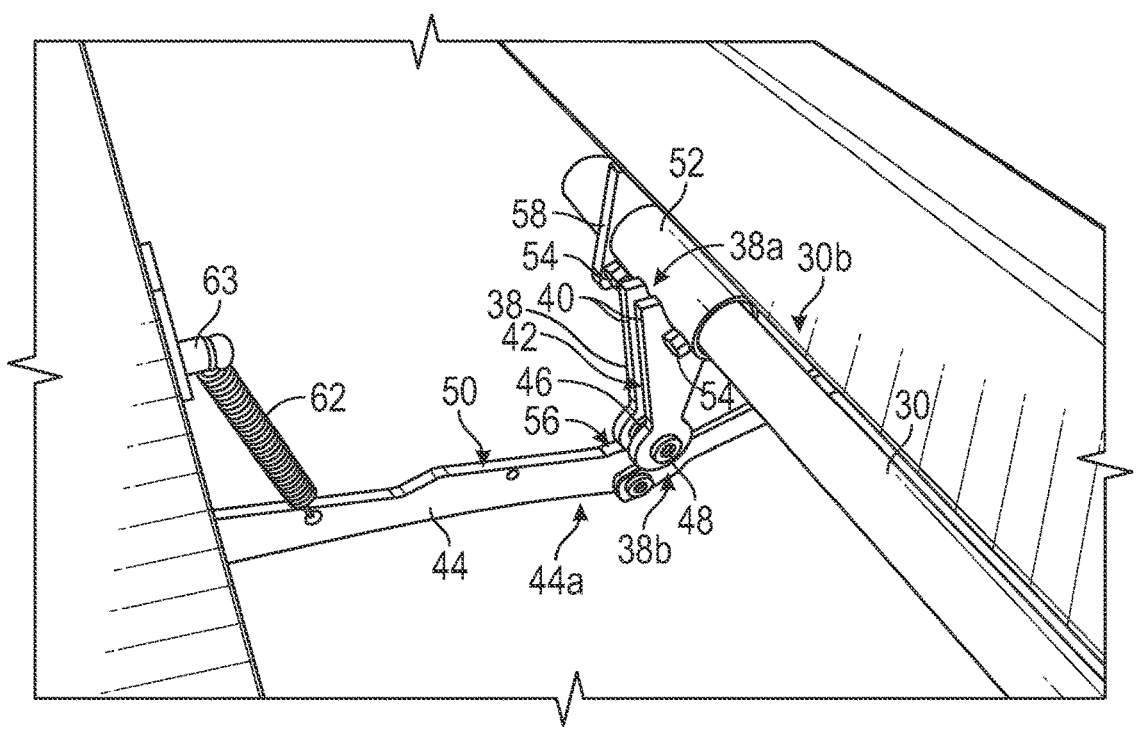
FIG. 6 is a top perspective view of the parking brake mechanism of the caster wheel parking brake system.

Caster wheel brake system 22 includes a foot-actuatable lever 28 at one end of cart 20, as shown in FIGS. 1-5. Lever 28 is coupled to a proximal end 30a of a torque shaft 30, which rotates with lever 28 and runs along a longitudinal axis of cart 20 beneath a lower support panel 32 thereof. In the illustrated embodiment, lever 28 has a pair of outboard legs 28a arranged in a V-shape to act as foot-actuated pedals, and a pair of inboard legs 28b arranged in a V-shape to act as rotation limiters when contacting an end piece 34 of the lower support panel 32, such as shown in FIG. 5. The shape of the inboard legs 28b permits lever 28 to pivot less than 90° from limit-to-limit, with one of the outboard legs 28a oriented approximately horizontally at each limit. Both sets of lever legs 28a, 28b are secured to the torque shaft 30, and a spacer 36 sets the outboard legs 28a sufficiently laterally outboard of end piece 34 to provide clearance for the outboard legs 28a to freely pivot as described above. Inboard legs 28b are mounted to torque shaft 30 by a mounting tube or collar 37 and a pair of threaded fasteners 39 that pass through both collar 37 and torque shaft 30. Optionally, shorter threaded fasteners may be used to provide rotational adjustability by extending radially inwardly through a tubular wall of the collar 37 and impinging on an outer surface of torque shaft 30 at its proximal end portion 30a. In order to make adjustments to the inboard legs 28b and the operation of brake system 22, such fasteners can be loosened, the rotational position of collar 37 and inboard legs 28b adjusted on torque shaft 30 as desired, and then the fasteners re-tightened. It will be appreciated that other forms of actuators may be used to rotate torque shaft 30, such as a hand-operated lever or crank positioned at a more elevated location along the cart 20.

Referring to FIGS. 2-4, 6, and 8A-9D, torque shaft 30 has a distal end portion 30b that is positioned at approximately a mid-point of cart 20, and that is fitted with an actuator arm 38 that rotates with torque shaft 30 and foot-actuatable lever 28. Actuator arm 38 rotates between a raised position for braking (FIGS. 8A and 9A) during parking of the cart 20, and a lowered position for non-braking (FIGS. 2-4, 8D, and 9D) when the cart 20 is to be permitted to roll on its wheels 24, 26. In the illustrated embodiment, actuator arm 38 is formed by two parallel and spaced-apart plates 40 that define a gap 42, which receives an upper region of a proximal end portion 44a of a parking brake lever 44, such as shown in FIGS. 4, 6, 8A-9B, and 9D. Optionally, and with reference to FIG. 6, a roller or bushing 46 is disposed in the gap 42 at a distal end 38b of actuator arm 38. The roller 46 is held in place by a fastener 48 and can roll or slide along an upper surface 50 of the parking brake lever 44. Actuator arm 38 includes a mounting tube or collar 52 at a proximal end 38a of the arm 38, with plates 40 secured to collar 52 by welding or other suitable attachment method or device. Collar 52 is fitted with a pair of threaded fasteners 54 that pass through both collar 52 and torque shaft 30. Optionally, shorter threaded fasteners may be used to provide rotational adjustability by extending radially inwardly through a tubular wall of the collar 52 and impinging on an outer surface of torque shaft 30 at its distal end portion 30b. In order to make adjustments to the actuator arm 38 and the operation of brake system 22, the short fasteners can be loosened, the rotational position of collar 52 and actuator arm 38 adjusted on torque shaft 30 as desired, and then the fasteners re-tightened.

Referring to FIGS. 6, 8A-8C, 9A, and 9B, upper surface 50 of parking brake lever 44 includes a raised detent ridge 56 that holds actuator arm 38, torque shaft 30, and foot-actuatable lever 28 in the fully non-braking position of FIGS. 2-4 and 6. As actuator arm 38 rotates toward the fully non-braking position, roller 46 passes over detent ridge 56 and comes to rest between detent ridge 56 and a proximal tip of parking brake lever 44, at the same time that one of the foot-actuatable lever's outboard legs 28a reaches a horizontal position as shown in FIG. 4, and one of the inboard legs 28b contacts end piece 34 of the lower support panel 32 (see FIG. 5) to prevent further rotation of torque shaft 30 and actuator arm 38.

Torque shaft 30 is rotatably supported at its distal end portion 30b by an inboard bracket 58, and at its proximal end portion 30a by an outboard bracket 60. Outboard bracket 60 may be L-shaped as shown in FIG. 5, with a lower leg 60a that may serve as an additional stop limit for outboard legs 28a of lever 28, and an upright leg 60b through which torque shaft 30 passes. In the illustrated embodiment of FIG. 5, spacer 36 and outboard legs 28a of lever 28 are positioned outboard of the outboard bracket's upright leg 60b. When lever 28 is moved away from the fully non-braking position of FIG. 4, roller 46 must first pass over detent ridge 56, thus creating an initial force resistance in lever 28 due to an upward biasing force imparted to parking brake lever 44 by a biasing member such as a coil spring 62, which is held in tension between parking brake lever 44 and an attachment point 63 along the lower support panel 32 (FIGS. 4, 6, 7, 8C, and 8D). As roller 46 reaches the top of detent ridge 56, further movement of lever 28 toward the braking position requires less force until still further movement is caused automatically by spring 62, as the angular position of actuator arm 38 moves closer to a horizontal position as shown in FIG. 8A, corresponding to the braking position. Therefore, it may be possible to cause the brake lever 44 to move from the fully non-braking position to the fully braking position with only an initial rotation force applied to lever 28, after which further movement toward the braking position is caused by spring 62. These movements of actuator arm 38 and parking brake lever 44, and the effect of tension spring 62, will be understood with reference to FIG. 8D, followed by reference to FIGS. 8C, 8B, and 8A.

Figure 7:
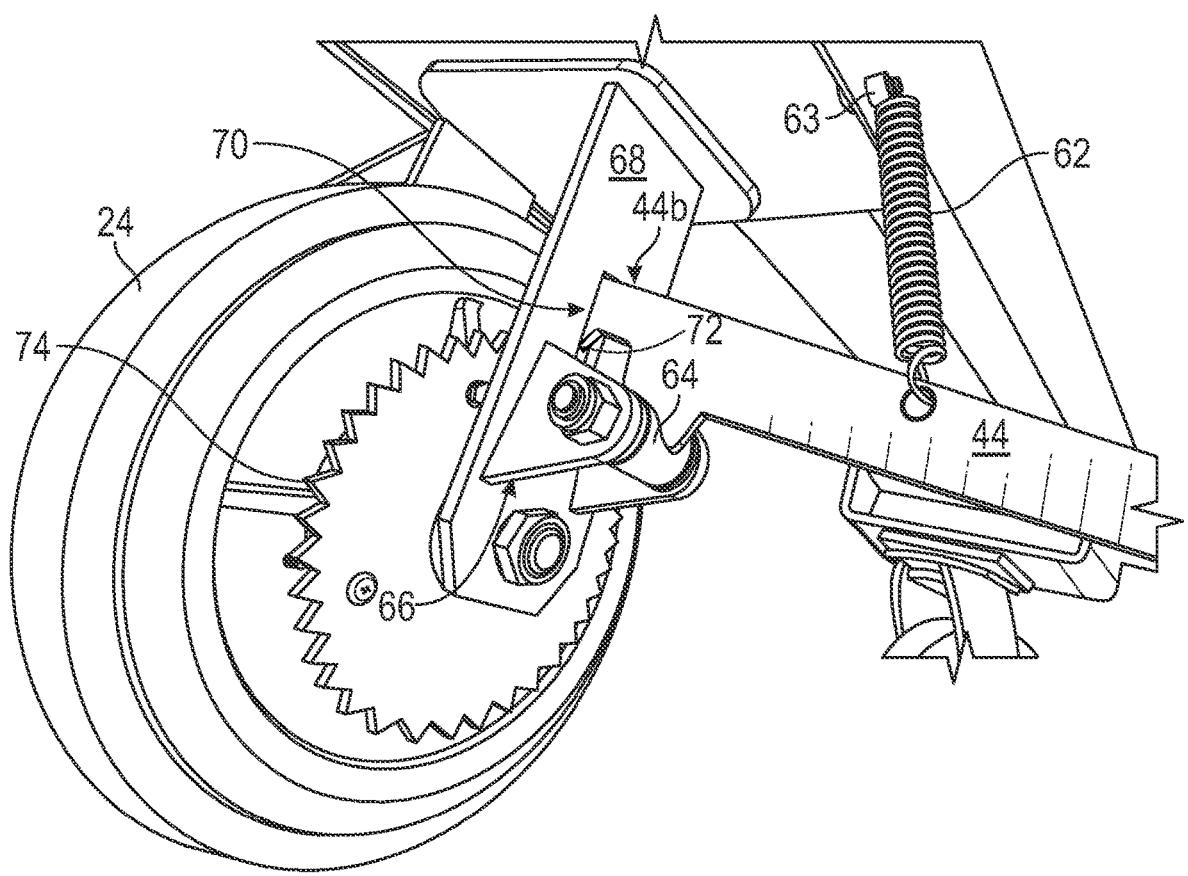
FIG. 7 is a bottom perspective view of a brake lever and caster wheel of the caster wheel parking brake system.
Figure 8A:
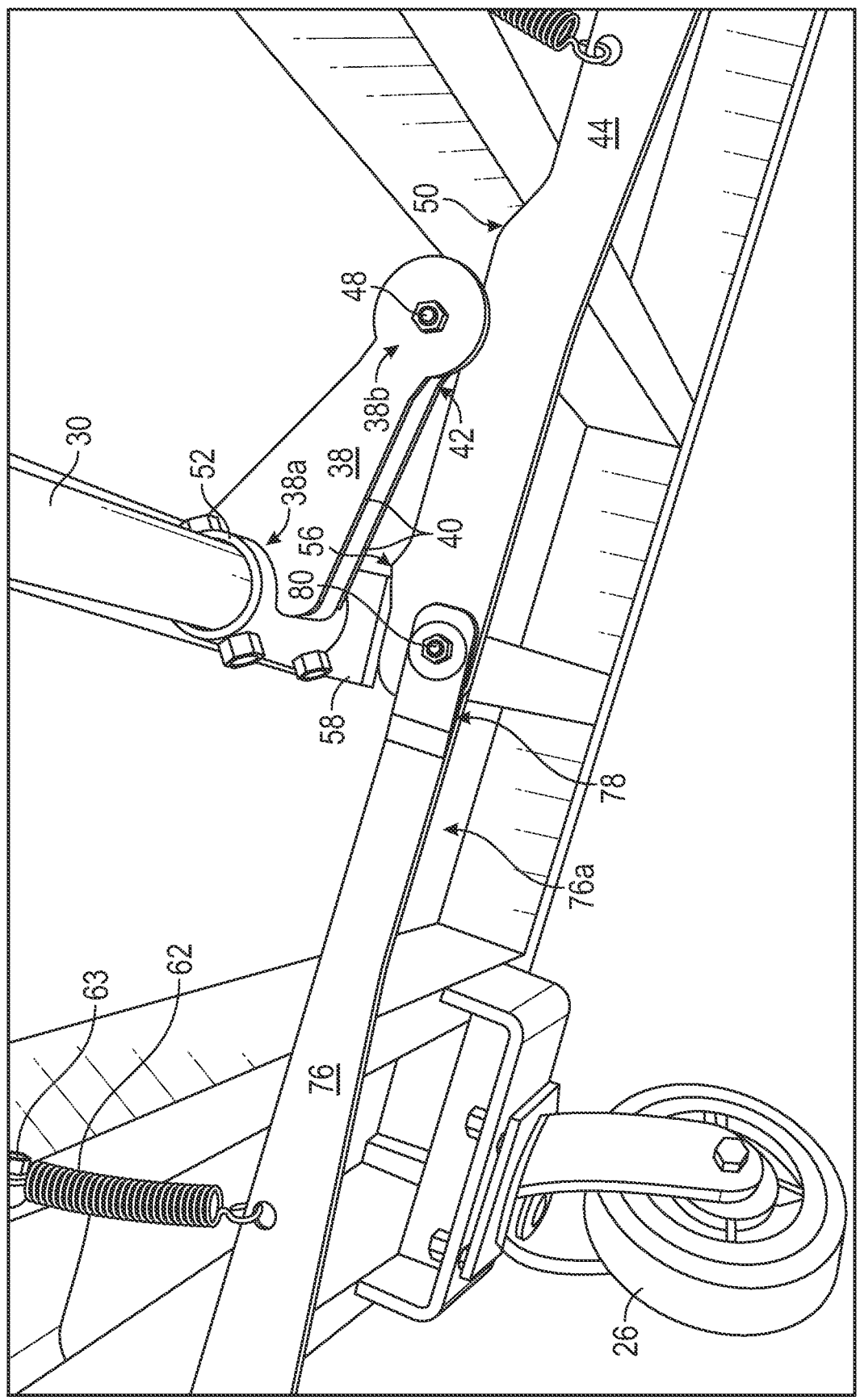
FIGS. 8A-8D are a series of bottom perspective views of a central portion of the parking brake mechanism, depicting movement from the braking position to the non-braking position.
Figure 8B:
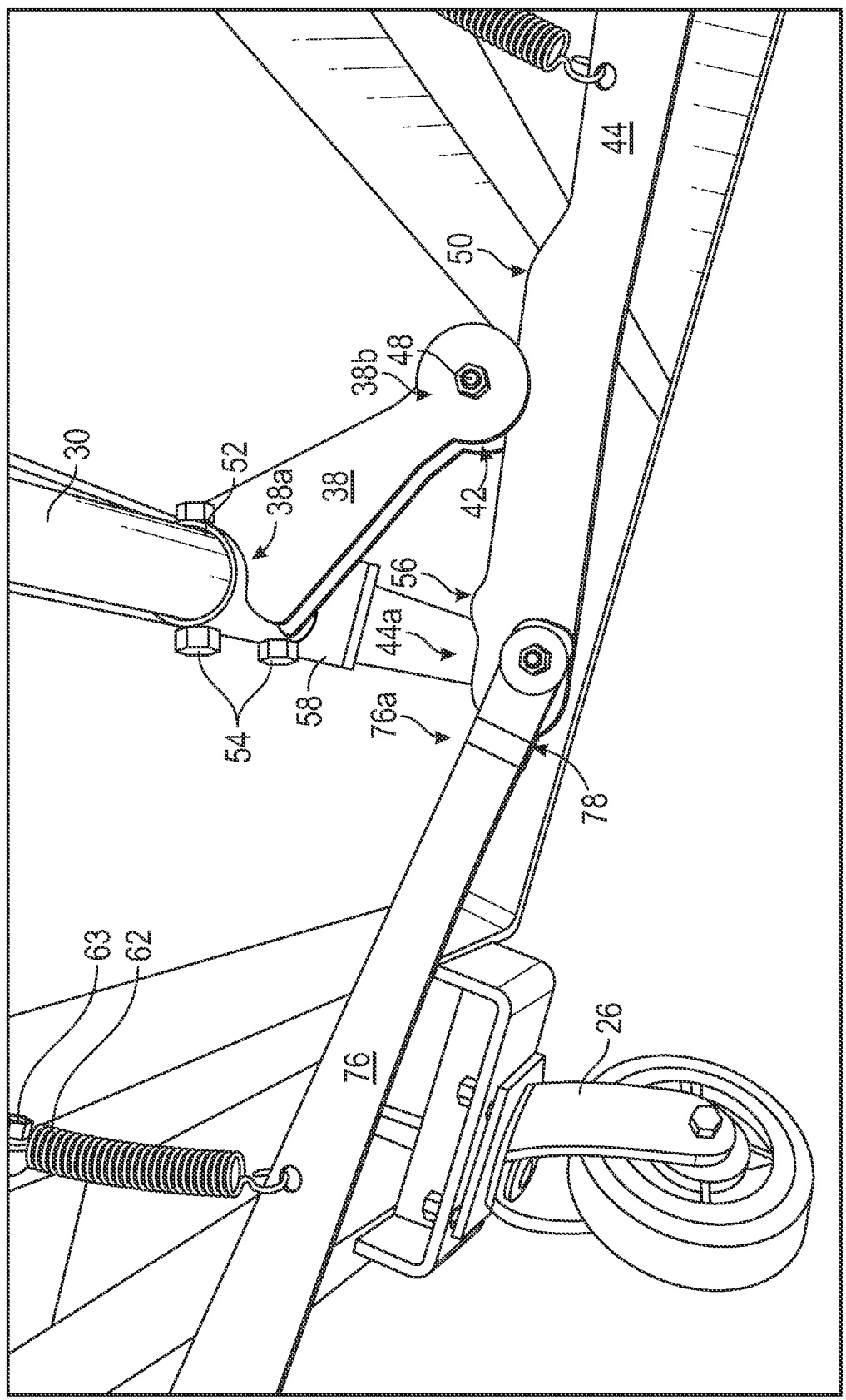
Figure 8C:
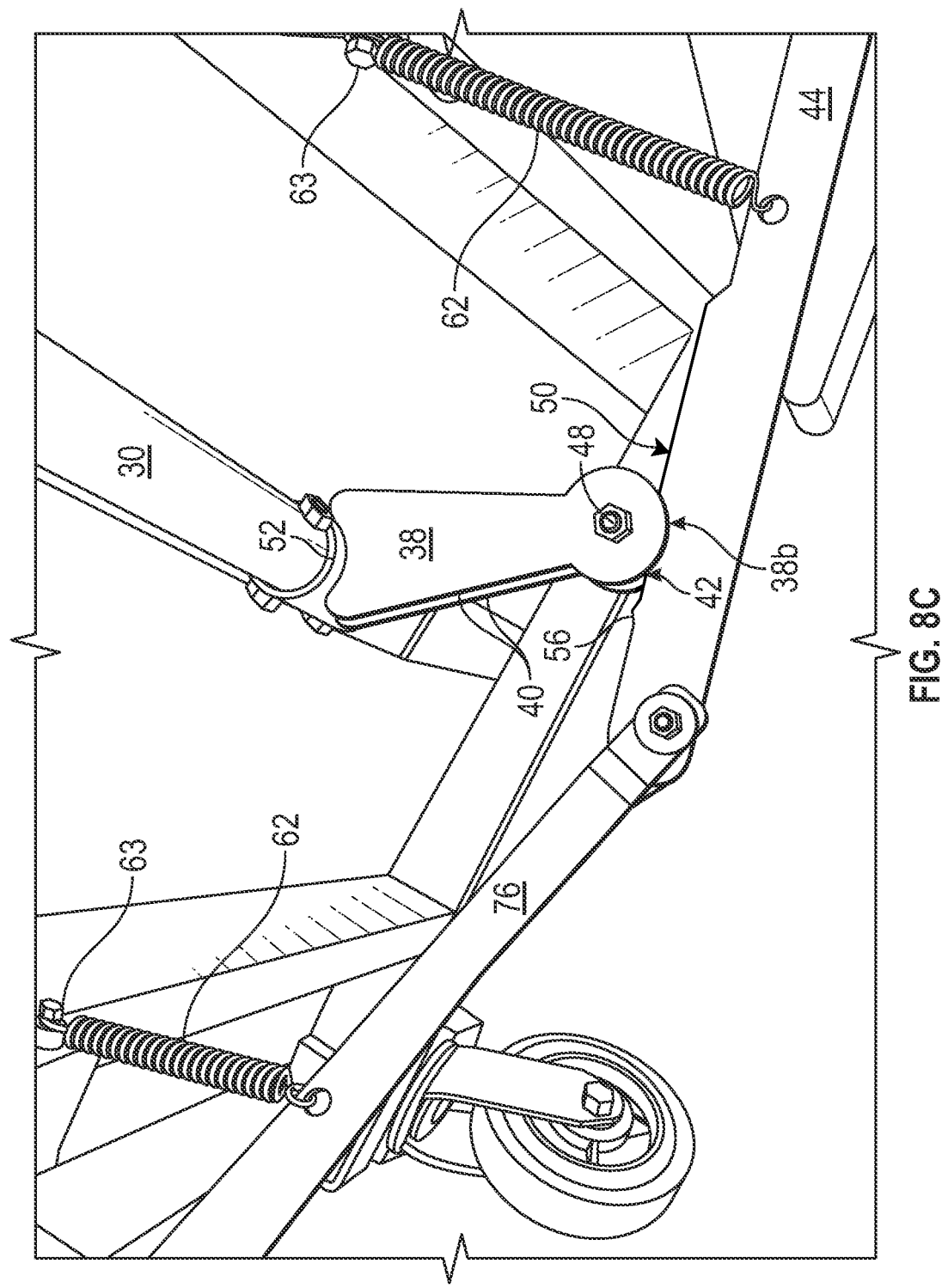
Figure 8D:
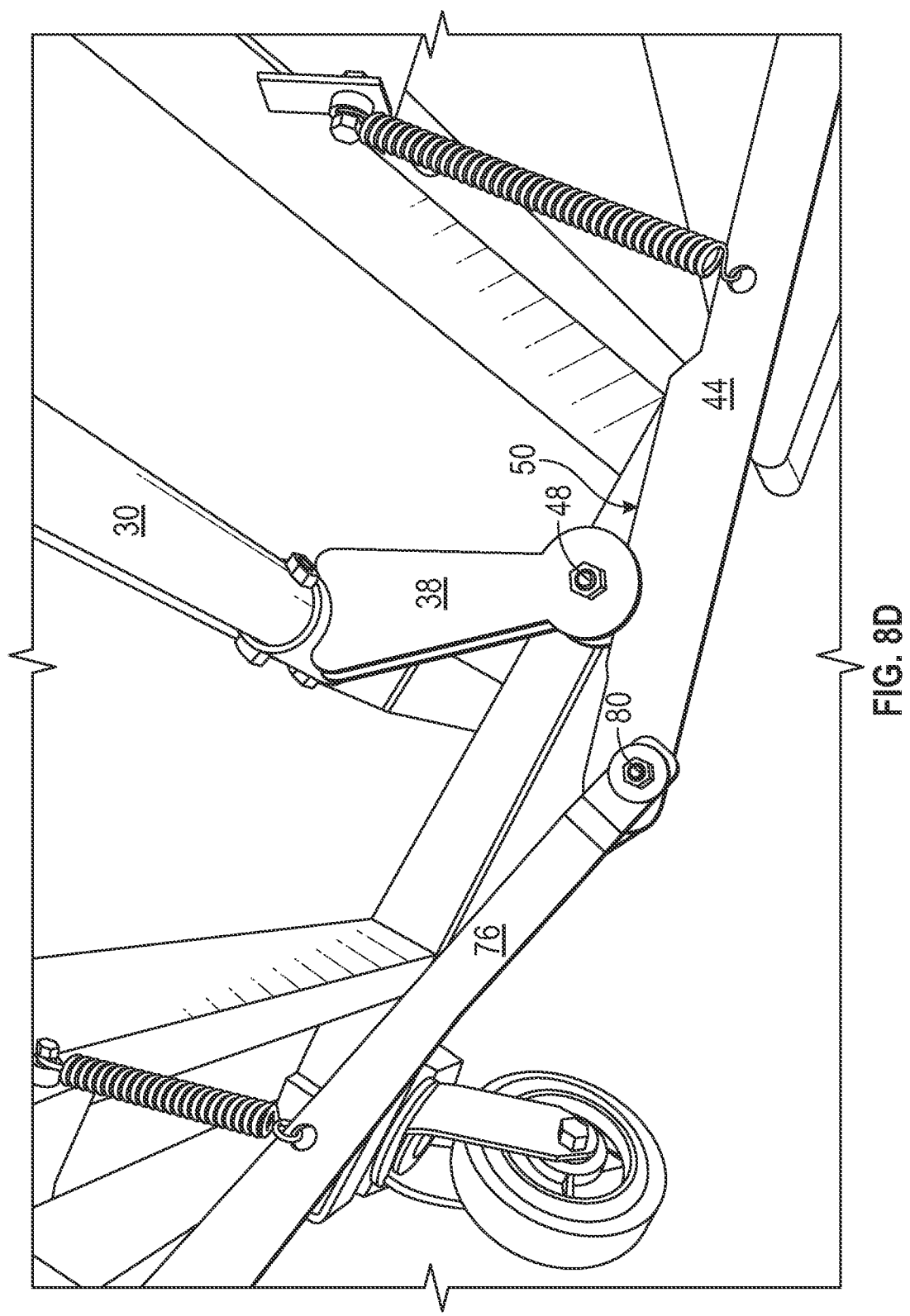
Figure 9A:
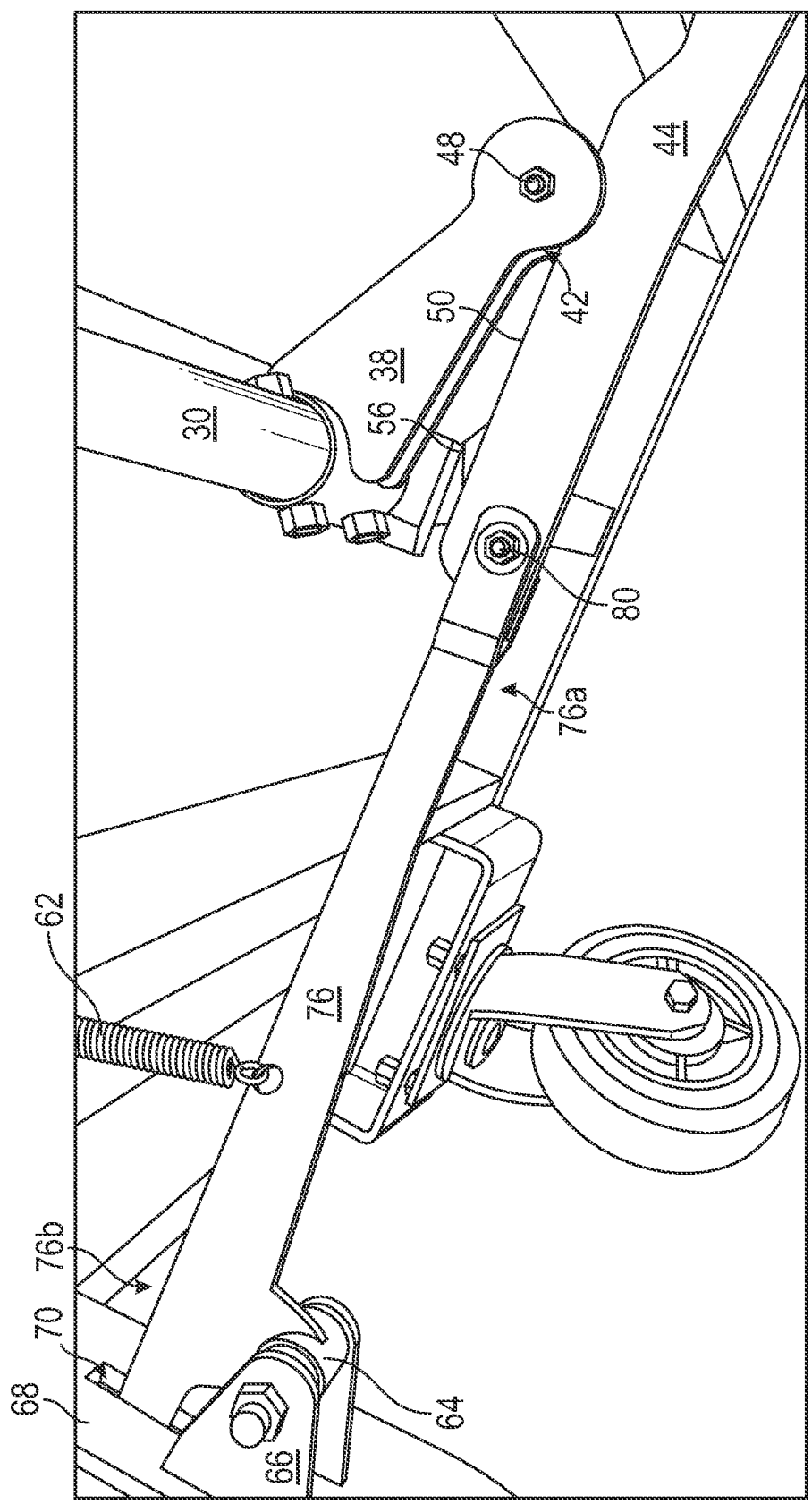
FIGS. 9A-9D are a series of bottom perspective views of central and outboard portions of the parking brake mechanism, depicting movement from the braking position to the non-braking position.
Figure 9B:
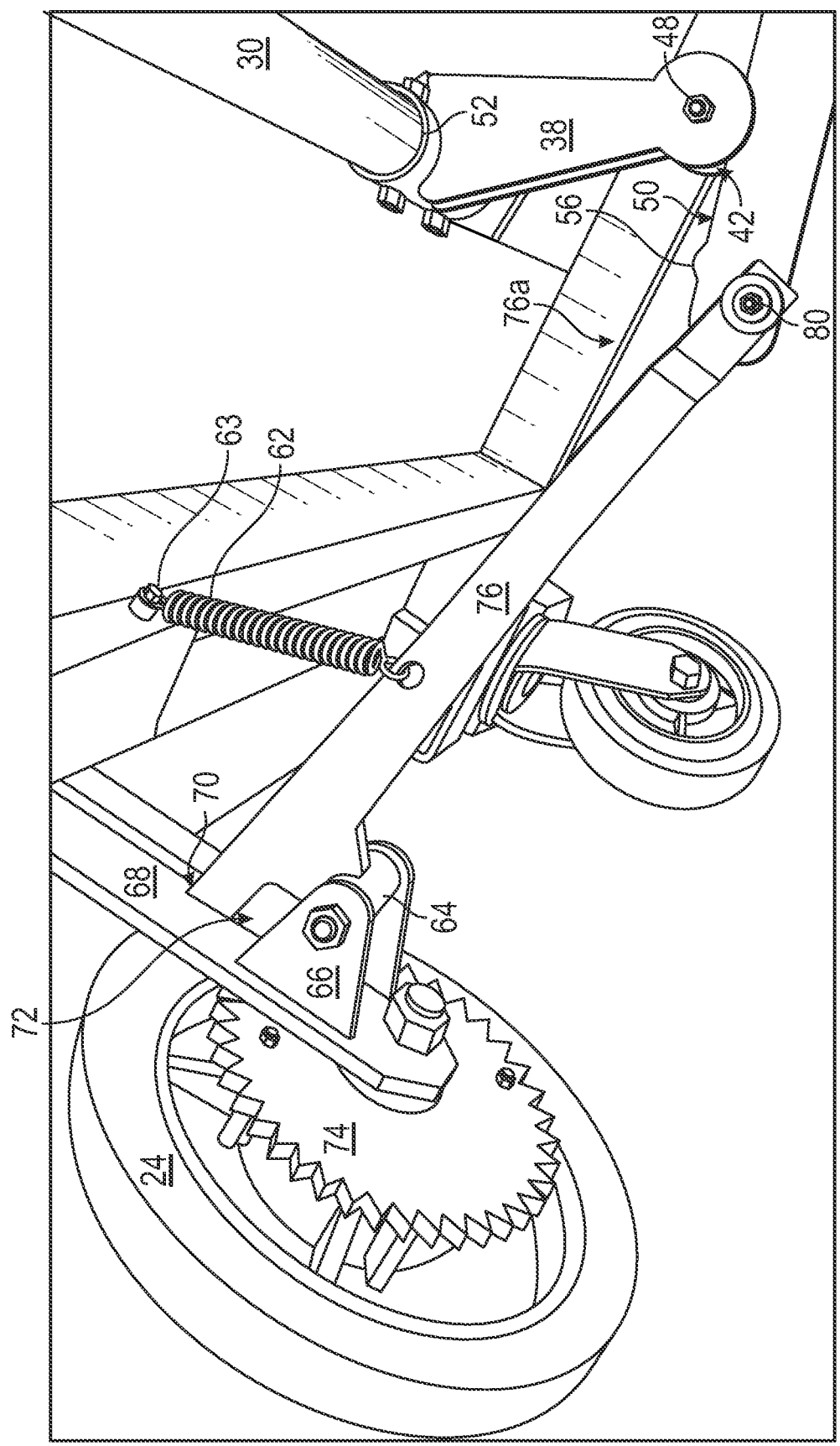
Figure 9C:
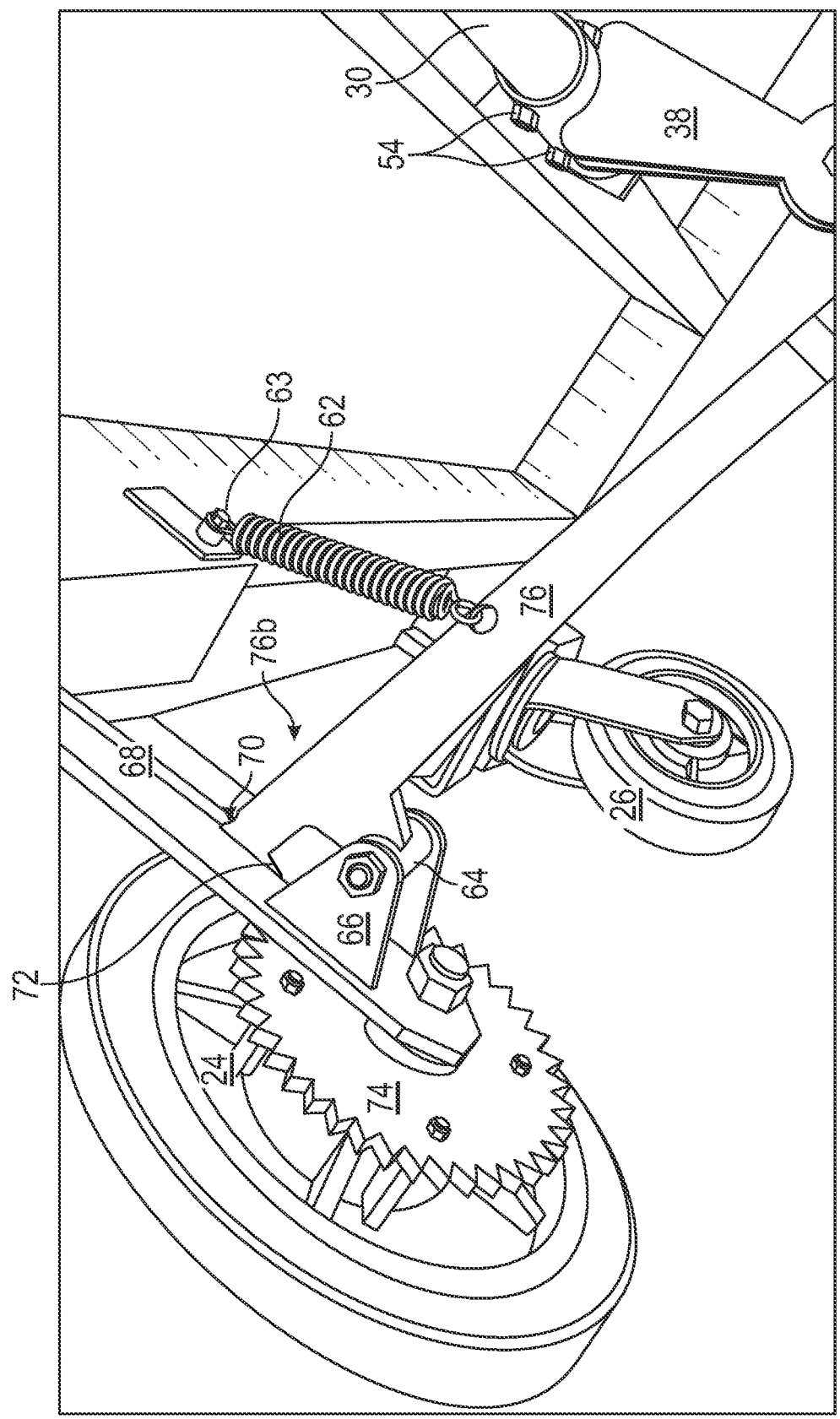
Figure 9D:
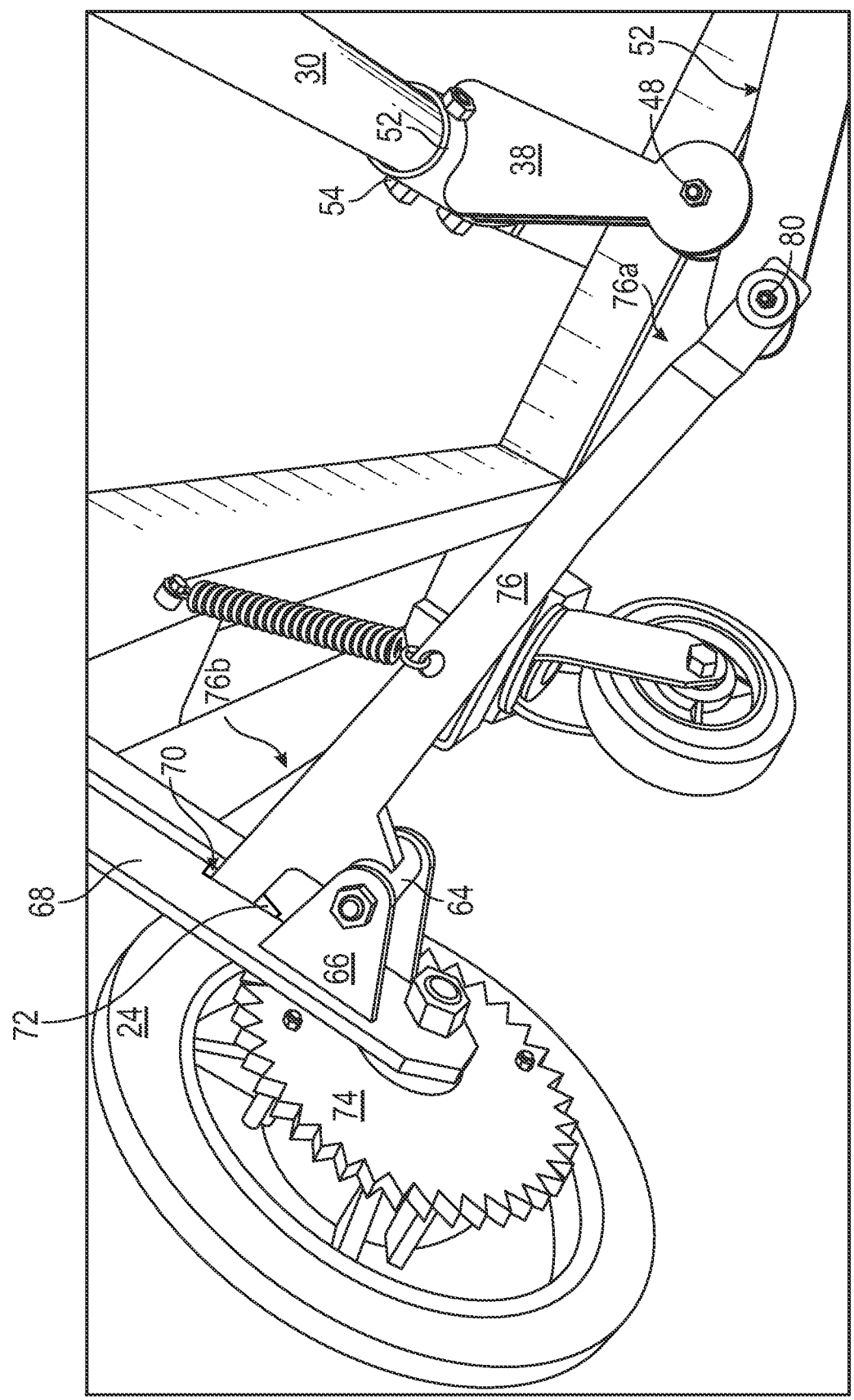

Parking brake lever 44 has a pivot coupling 64 where the brake lever 44 is coupled to a fulcrum or pivot mount 66 which, in the illustrated embodiment, is attached to a wheel bracket support 68 for one of the center caster wheels 24, such as shown in FIGS. 4 and 7. Pivot coupling 64 is located along or near a distal end portion 44b of a parking brake lever 44. The parking brake lever's distal end portion 44b extends through a slot 70 formed in wheel bracket support 68, which is laterally outboard of pivot coupling 64 and pivot mount 66. Distal end portion 44b terminates in a downwardly-extending pawl 72 that selectively engages a toothed gear wheel 74 that is secured to (and rotates with) the center caster wheel 24. Rotating actuator arm 38 to the downward or non-braking position of FIG. 6 moves proximal end portion 44a of brake lever 44 to its lowest position, which raises distal end portion 44b of brake lever 44 to its highest position, in which pawl 72 disengages the toothed gear wheel 74 and allows center caster wheel 24 to rotate freely, for repositioning the cart 20 as desired.

In the illustrated embodiment, another pivotable parking brake lever 76 is slaved to the brake lever 44 such that the slaved brake lever's movement mirrors that of brake lever 44. A yoke-type coupling is formed between proximal end portion 44a of brake lever 44 and a proximal end portion 76a of slaved brake lever 76. The slaved brake lever's proximal end portion 76a is forked so as to define a gap 78 that receives proximal end portion 44a of brake lever 44. A single fastener or pin 80 passes through both proximal end portions 76a, 44a to provide a pivoting connection between the two. A distal end portion 76b of slaved brake lever 76 is configured substantially the same as distal end portion 44b of brake lever 44, including a pawl 72 for engaging the toothed gear wheel 74 of the associated center caster wheel 24, and a pivot coupling 64 coupled to a pivot mount 66 along the associated wheel bracket support 68 (FIGS. 4 and 9A-9D). Another tension spring 62 is coupled between a midpoint of slaved brake lever 76 and another attachment point 63 along the lower support panel 32, and provides the same lifting function as the tension spring 62 associated with brake lever 44.

The two tension springs 62, acting on respective ones of the brake lever 44 and the slaved brake lever 76, cooperate to raise the proximal ends 44a, 76a of the two brake levers 44, 76 and engage the pawls 72 with the respective center caster wheels 24, maintaining the brake levers 44, 76 in the braking position and thus maintaining both center caster wheels 24 in the braked condition. When the wheel brake system 22 is in the braking position and a user presses down on the raised outboard leg 28a, torque shaft 30 and actuator arm 38 rotate toward the non-braking position, causing roller 46 to roll or slide along upper surface 50 of parking brake lever 44 and urging the brake levers' proximal end portions 44a, 76a downwardly (see FIGS. 8A-8D and 9A-9D). This movement causes the springs 62 to stretch and provide resistance to rotation out of the braking position, such that a rotational force must be continuously applied to an outboard leg 28a of foot lever 28 to move the system 22 to the non-braking position. Once the roller 45 has passed over the detent ridge 56, the actuator arm 38 is approximately vertical and the pawls 72 are disengaged from the respective gear wheel 74, thus simultaneously freeing both of the center caster wheels 24 to rotate so that cart 20 can be moved. The upward biasing force of springs 62 and the detent ridge 56 prevent the actuator arm 38 from rotating back toward the braking position until the other outboard leg 28a, which is now raised, is pressed downwardly by the user. As described above, that force must initially overcome spring force to move roller 46 over detent ridge 56, and to subsequently continue to move the torque shaft 30 and the actuator arm 38 toward the braking position, which subsequent movement is aided by or caused by the springs 62 as described above.

Therefore, the wheel brake system of the present invention provides a convenient way to secure two caster wheels at opposite sides of a cart, for parking the cart along an incline or preventing inadvertent movement. A single lever-press moves the brake pawls into or out of engagement with a toothed wheel associated with each caster wheel. By simultaneously securing two central caster wheels that typically bear most of the load, a cart or other wheeled structure can be secured against both rolling and pivoting or rotating movement along a floor or other support surface. The brake system is relatively simple and robust, easily serviced, and unlikely to require adjustments over significant periods of use.

Moreover, numerous variations on the braking system may be envisioned. For example, the pawls or other contacting surfaces may directly engage a portion of a wheel to be braked, rather than relying on a separate toothed wheel. A single brake lever may be used to brake one wheel, instead of two brake levers braking two wheels. The pivot fulcrums can be moved to provide desired leverage and/or movement distance of the pawls or other contacting surfaces. A slot may be provided in one of the brake levers for receiving a pin associated with the actuator arm, which may obviate the need for tension springs or other biasing members, provided that detents or other means are provided to help ensure that the brake system is maintained in the braking position until it is intentionally moved to the non-braking position. Thus, the braking mechanisms may be configured in numerous different ways without departing from the spirit and scope of the present invention Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A caster wheel brake system for a mobile support device, said caster wheel brake system comprising:
   first and second parking brake levers movable between braking and non-braking positions, each of said brake levers comprising:
     a distal end portion configured to engage a portion of a respective caster wheel in the braking position;
     a proximal end portion opposite said distal end portion; and
     a pivot coupling attached to the mobile support device;
   a torque shaft comprising a distal end portion proximate said proximal end portions of said brake levers; and
   an actuator arm extending outwardly from said distal end portion of said torque shaft, said actuator arm engaging said proximal end portion of only said first brake lever;
   wherein said brake levers are coupled together at said proximal end portions, with said distal end portions extending outwardly away from one another; and
   wherein said torque shaft and said actuator arm are rotatable simultaneously together to urge said brake levers toward their respective non-braking positions.

2. The caster wheel brake system of claim 1, wherein said pivot couplings are disposed between said proximal and distal end portions of each of said brake levers.

3. The caster wheel brake system of claim 1, further comprising a resilient member coupled to one of said brake levers, said resilient member configured to bias said brake lever toward the braking position, wherein said torque shaft and said actuator arm are rotatable to urge said brake lever toward the non-braking position.

4. The caster wheel brake system of claim 3, wherein said resilient member comprises a tension spring coupled between said proximal end portion of said one of said brake levers and the mobile support device.

5. The caster wheel brake system of claim 1, wherein said distal end portions of said brake levers each comprise a pawl for engaging a gear wheel of the respective caster wheel when said brake levers are in the braking position.

6. The caster wheel brake system of claim 5, wherein said pivot couplings are disposed between respective ones of said pawls and said proximal end portions of said brake levers.

7. The caster wheel brake system of claim 1, further in combination with the caster wheels, wherein said caster wheels are configured for mounting to the mobile support device.

8. The caster wheel brake system of claim 7, wherein said caster wheels each comprise a respective gear wheel, and said distal end portions of said brake levers each comprise a pawl for engaging said respective gear wheel when said brake levers are in the braking position.

9. The caster wheel brake system of claim 1, wherein said actuator arm defines a gap for receiving said proximal end portion of said first brake lever.

10. The caster wheel brake system of claim 1, wherein said first brake lever comprises a detent that releasably retains said actuator arm and said torque shaft so that said brake levers are releasably maintained in the non-braking position.

11. A mobile cart comprising the caster wheel brake system of claim 1.

12. A caster wheel brake system for a mobile support device, said caster wheel brake system comprising:

first and second pivotable parking brake levers movable between braking and non-braking positions, each of said brake levers comprising:
- a distal end portion configured to selectively engage a portion of a respective caster wheel;
- a proximal end portion opposite said distal end portion, wherein said proximal end portions of said brake levers are coupled together; and
- a pivot coupling attached to the mobile support device;

a torque shaft having an actuator arm configured for engaging said proximal end portion of said first brake lever; and a tension spring coupled between said proximal end portion of each brake lever and the mobile support device, said tension springs configured to bias said brake levers toward the braking position;

wherein said torque shaft and said actuator arm are rotatable together to simultaneously urge said brake levers toward the non-braking position.

13. The caster wheel brake system of claim 12, wherein said actuator arm engages and travels along a surface of said first brake lever during movement from the braking position to the non-braking position.

14. The caster wheel brake system of claim 13, further comprising a lever or handle coupled to said torque shaft and spaced apart from said actuator arm, wherein said lever or handle is rotatable with said torque shaft and said actuator arm to allow remote operation of said caster wheel brake system.

15. A caster wheel brake system for a mobile support device, said caster wheel brake system comprising:
   first and second pivotable parking brake levers movable between braking and non-braking positions, each of said brake levers comprising:
   - a distal end portion configured to selectively engage a portion of a respective caster wheel;
   - a proximal end portion opposite said distal end portion, wherein said proximal end portions of said brake levers are coupled together; and
   - a pivot coupling attached to the mobile support device; and a torque shaft having an actuator arm configured for engaging said proximal end portion of said first brake lever;

wherein said torque shaft and said actuator arm are rotatable together to simultaneously urge said brake levers toward the braking or non-braking position;

wherein said actuator arm engages and travels along a surface of said first brake lever during movement from the braking position to the non-braking position; and wherein said surface of said first brake lever comprises a detent that is traversed by said actuator arm as the non-braking position is reached, wherein said detent releasably retains said actuator arm and said torque shaft so that said brake levers are releasably maintained in the non-braking position.

16. The caster wheel brake system of claim 15, further comprising a tension spring coupled between said proximal end portion of each brake lever and the mobile support device, said tension springs configured to bias said brake levers toward the braking position, wherein said torque shaft and said actuator arm are rotatable to urge said brake levers toward the non-braking position.

17. A method of applying a parking brake to a caster wheel for a mobile support device, said method comprising:
   rotating a torque shaft and an actuator arm that extends outwardly from a distal end portion of the torque shaft;
   moving a proximal end portion of a parking brake lever from a non-braking position to a braking position by moving the actuator arm along a proximal end portion of the brake lever and biasing the brake lever to the braking position with a tension spring coupled between the brake lever and the mobile support device;
   wherein said moving the actuator arm along the proximal end portion of the brake lever comprises traversing the actuator arm over a detent at the proximal end portion of the brake lever;
   moving a distal end portion of the brake lever to the braking position in response to said moving the proximal end portion of the brake lever to the braking position, by pivoting the brake lever about a pivot coupling attached to the mobile support device; and
   securing the caster wheel against rotation by engaging the distal end portion of the brake lever with a portion of the caster wheel.

* * * * *